US006658814B2

(12) United States Patent
Spatz et al.

(10) Patent No.: US 6,658,814 B2
(45) Date of Patent: Dec. 9, 2003

(54) FEED UNIT FOR A CONTAINER CLOSURE DEVICE

(75) Inventors: Günther Spatz, Lampertheim (DE); Wolfhard Schwarz, Worms (DE); Karl Heinz Spether, Ladenburg (DE)

(73) Assignee: Alcoa Deutschland GmbH Verpackungswerke (DE)

(*) Notice: Subject to any disclaimer, the term of this patent is extended or adjusted under 35 U.S.C. 154(b) by 0 days.

(21) Appl. No.: 09/886,706

(22) Filed: Jun. 21, 2001

(65) Prior Publication Data

US 2002/0020719 A1 Feb. 21, 2002

(30) Foreign Application Priority Data

Jun. 21, 2000 (DE) ........................................ 100 29 511

(51) Int. Cl.[7] ............................ B65B 7/28; B65B 3/06; B23Q 7/04

(52) U.S. Cl. ............................ 53/306; 53/310; 221/210

(58) Field of Search ................................ 221/210, 211, 221/212; 53/306, 308, 309, 310

(56) References Cited

U.S. PATENT DOCUMENTS

| | | | | | |
|---|---|---|---|---|---|
| 1,721,264 | A | | 7/1929 | Taylor | |
| 2,106,365 | A | * | 1/1938 | Tiano | 53/306 |
| 2,872,765 | A | * | 2/1959 | Michlein | 53/306 |
| 3,643,398 | A | * | 2/1972 | Quest et al. | 53/306 |
| 3,683,588 | A | * | 8/1972 | Ahlers | 53/308 |
| 4,369,570 | A | * | 1/1983 | Madden et al. | 53/308 |
| 4,756,137 | A | | 7/1988 | Lanigan | |
| 5,115,617 | A | * | 5/1992 | Lewis et al. | 53/306 |
| 5,309,696 | A | | 5/1994 | Heudecker | |
| 5,531,057 | A | * | 7/1996 | Coleman et al. | 53/306 |
| 5,996,308 | A | * | 12/1999 | Nakamura | 53/306 |

FOREIGN PATENT DOCUMENTS

| | | | | | |
|---|---|---|---|---|---|
| CA | 2084783 | | | 12/1991 | |
| DE | 4030928 | A1 | | 4/1992 | |
| DE | 9104140.6 | | | 4/1992 | |
| DE | 4129452 | | | 1/1993 | |
| DE | 4129452 | A1 | * | 1/1993 | B67B/3/02 |
| FR | 2257532 | | | 8/1975 | |
| FR | 2571348 | | | 4/1986 | |
| GB | 1447951 | | | 9/1976 | |
| WO | 9316952 | | | 9/1993 | |
| WO | WO 93/16952 | | * | 9/1993 | B67B/3/06 |

* cited by examiner

*Primary Examiner*—Anthony Stashick
(74) *Attorney, Agent, or Firm*—Ostrolenk, Faber, Gerb & Soffen, LLP

(57) ABSTRACT

A feed unit for a container closure device, with a feed device for container closures and a transfer device which transfers the closures from the feed device to a workstation at which containers are closed. The feed device has a rail that terminates at a stationary check shoulder which protrudes into the feed path of the closures along the feed device rail to position each closure to be picked up by the transfer device moving on a path.

24 Claims, 1 Drawing Sheet

FEED UNIT FOR A CONTAINER CLOSURE DEVICE

BACKGROUND OF THE INVENTION

The invention relates to a feed unit for a container closure device and particularly to the feed path of the closure parts.

Feed units of the type discussed here, in particular for closing bottles, are known. They have a feed device for closure parts, and also a transfer device which transfers the closure parts from the feed device. When the feed device is in operation, the closure parts are delivered continuously to the feed device and are individually removed from the latter by the transfer device. To maintain the closure parts in a defined position for the transfer procedure, holding fingers are used which securely hold the closure parts delivered by the feed device at a predetermined position. The mechanical design of the holding fingers and their timing control are very elaborate and make them susceptible to breakdown.

SUMMARY OF THE INVENTION

It is therefore an object of the invention to provide a feed unit which is of the type mentioned at the outset but which does not have these disadvantages.

To achieve this object, a feed unit for a container closure includes a feed path with a rail or channel that feeds the closure parts. The feed unit feed device includes a stationary check shoulder which is arranged in the feed path of the closure parts. The term stationary here signifies that the check shoulder does not have to execute any movement whatsoever to arrest the closure parts delivered to it. This does not exclude the possibility of the check shoulder being removed, for example folded out or swiveled out, from the feed path of the closure parts, for example for repair work and servicing. The feed movement of the closure parts is stopped by the stationary check shoulder so that the closure parts can be held and transferred without difficulty by the transfer device. Since the contact shoulder is stationary, no controls are needed to stop the feed movement of the closure parts for their transfer by the transfer device. The feed unit is therefore of very simple design and is not susceptible to breakdown. The production costs are substantially reduced compared to conventional feed units.

Other objects and features of the invention are explained below with reference to the drawings.

DESCRIPTION OF A PREFERRED EMBODIMENT

Figure 1:
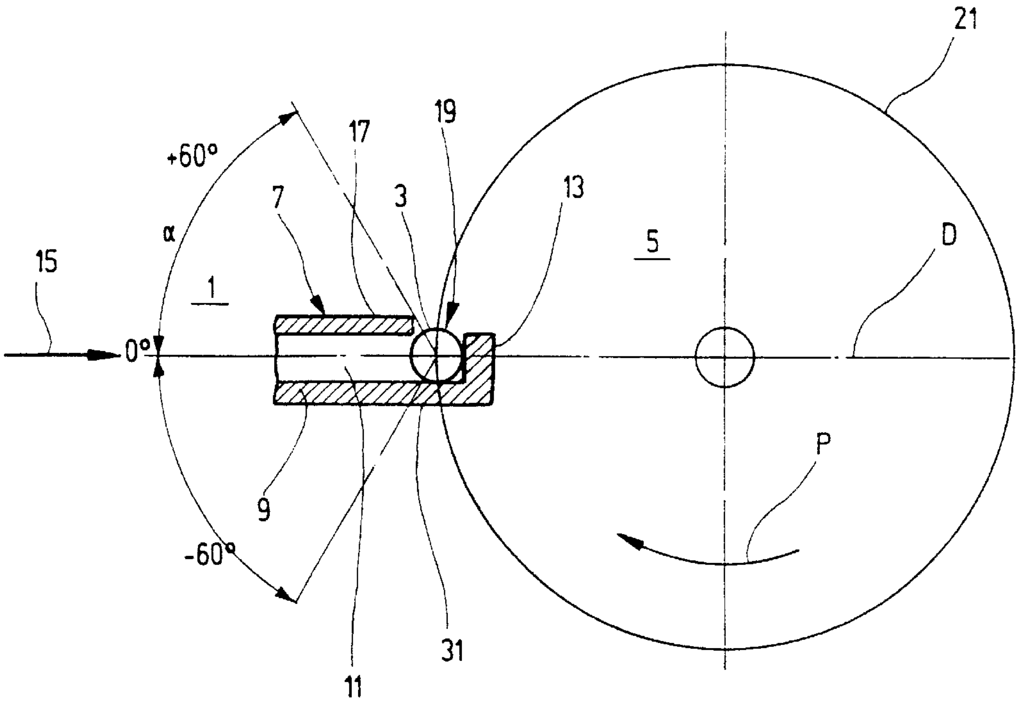
FIG. 1 is a diagrammatic representation of a fragment of a container closure device.

FIG. 1 shows part of a feed unit 1 which delivers closure parts 3 to a workstation 5.

The feed unit 1 may include storage containers for the closure parts, sorting devices, such as hoppers or the like, and a feed device 7 which delivers the closure parts 3 to a transfer device. For reasons of clarity, the transfer device is not shown in FIG. 1. The feed device 7 comprises a feed rail 9 which has a transport channel 11 in which the closure parts 3 are conveyed in continuous series and at a defined orientation, for example, using air for conveyance. A check shoulder 13 protrudes into the feed path of the closure parts 3, i.e. into the transport channel 11. The closure parts 3 that are delivered by the feed device 7 run up against the check shoulder 13 where they come to a stop. The bearing surface for the closure parts 3 is here formed by a transport channel 11 in which the closure parts 3 are transported and delivered to the workstation 5.

The check shoulder 13 is stationary. It is here shown as part of the feed rail 9. It is therefore of very simple design. In particular, no controls or holding fingers are needed in order to keep the closure parts 3 in the transfer area. It is of course possible to provide the check shoulder 13 so that it can be screwed off, tilted off or swiveled aside, for example, in order to provide access to clean the transport channel 11 or to carry out other repairs or servicing.

FIG. 1 shows a plan view of the feed rail 9 and the closure part 3. The check shoulder 13 is arranged, in the transport direction indicated by an arrow 15, spaced a distance away from an upper boundary wall 17 of the feed rail 9. That distance is selected to define an opening 19 in the feed rail 9. A closure part 3 may be guided through the opening 19 from the feed device 7 or feed rail 9. This view shows that the opening 19 is offset in relation to the feed direction 15 such that the closure parts 3 cannot readily fall out of or be pressed out of the transport channel 11.

In the illustrated embodiment of the container closure device shown here, the workstation 5 has a rotor which, for example, is part of a rotary indexing table to which containers not shown here, for example bottles, are delivered in order to be closed. The workstation 5 has a transfer device provided with a transfer head. That head is guided in the direction of a circular movement path 21 indicated by the arrow P line. The feed unit 1 or its feed rail 9 is arranged such that a closure part 3 comes to a stop against the check shoulder 13 where the closure part 3 is arranged in the area of the movement path 21. The center point of the closure part 3 preferably lies on the movement path 21, so that it can be taken up by the transfer head.

In the plan view of FIG. 1, the feed rail 9 is positioned along the direction of an imaginary diameter line D. This position is defined as an angle $\alpha=0°$. Broken lines indicate that the feed rail 9 may be swiveled downward around the center of station 5 by 60° relative to this start position. This position is defined as $\alpha=-60°$. It is also possible to swivel the feed rail 9 in the opposite direction, for example until it assumes an angle of 60°. This position is defined as $\alpha=+60°$. When the opening 19 is moved to the underside of the feed rail 9, the feed device 7 can also remove closure parts 3 from the feed rail 9 in an opposite working direction, that is, when the transfer head of a transfer device is displaced in a direction counter to the arrow P.

In total, the angle $\alpha$ may therefore lie over a range of ±60°. A range of +60° to −20° is preferred, in particular from 60° to 40° on the one hand and down to −10° on the other.

Figure 2:
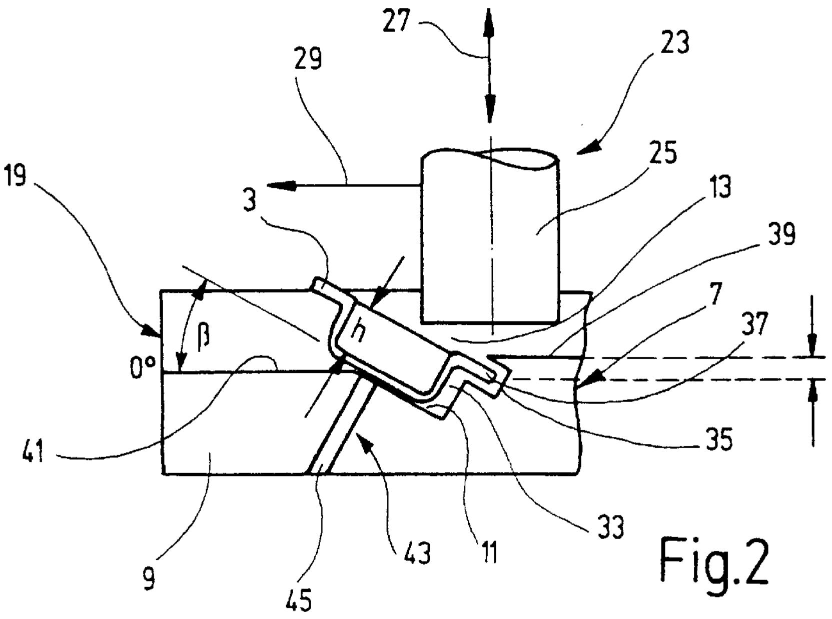
FIG. 2 is a cross section through a feed unit of the container closure device represented in FIG. 1.

FIG. 2 shows a cross section through the feed unit 1, and specifically a cross section through the feed rail 9 in the same area in which the closure part 3 is shown in FIG. 1.

The cross-sectional view shows that the bearing surface for the closure parts 3, or the transport channel 11, is inclined at least in the area in which the transfer device 23 cooperates with the closure part 3. A transfer head 25, which may be referred to as a pick-up head, is part of the transfer device 23. The transfer head 25 is preferably movable up and down, as shown by the double arrow 27, and it can be guided on the movement path 21, specifically in the direction indicated by the arrow 29, in this case from right to left.

FIG. 2 shows that in the transfer area, the closure part 3 is inclined such that the transfer head 25 engages inside the closure part 3 as it is guided in the direction of the arrow 29 across the front part of the feed rail 9 near the check shoulder. The transfer head 25 can be lowered inside the closure part 3 in order to secure the closure part. The transfer head 25 drags the closure part 3 out through the opening 19 permitting a subsequent closure part 3 to be guided inside the feed rail 9 until it bears in turn on the check shoulder 13 and is thus made ready for renewed transfer by a transfer head.

FIG. 2 shows that a closure part 3 can also be taken from the transfer area of the feed rail 9 when the movement path of the transfer head 25 is rectilinear, i.e. of a different configuration than that path represented in FIG. 1.

The closure parts 3 are transported with the feed rail 9 at a predetermined orientation. This ensures that the transfer head 25 can always engage inside a closure part 3 in order to remove it easily from the feed device 7.

The diameter of the transfer head 25 is adapted to the internal diameter of the closure parts 3 so that the parts can be reliably secured by the head. The transfer head 25 is introduced inside each closure part 3 to secure the part on the lower part of the transfer head 25.

The angle of inclination of the transport channel 11 relative to an imaginary horizontal is indicated by β in FIG. 2. That angle is chosen for example from a range of 5° to 80° and in particular as a function of the height h of the closure part 3. The taller is the closure part, the greater also is the angle of inclination β. The closure part 3 is therefore inclined in the transfer area in order to ensure that the transfer head 25, also referred to as the pick-up stamp, can engage securely in the closure part 3.

The discussion of FIGS. 1 and 2 shows that with regard to the function of the feed unit 1, it is not important whether the closure part 3 is a finished bottle closure or what is known as a preliminary closure which is placed on a container, in particular on a bottle, to provisionally close the bottle. The final closure cap, which can be made of metal or plastic, then engages over such a preliminary closure.

Nor is it important, with regard to the function of the feed unit 1, whether the transfer device 23 places the closure part 3 directly on the container to be closed, which would be the simplest configuration of a bottle closure device, or whether the transfer device 23 transfers the closure part 3 to a closure device which then places the closure part 3 on a container, in particular on a bottle.

It will also be evident that the inclination of the feed rail 9 in relation to the workstation 5 can be chosen within a wide range. It is in principle therefore also possible to swivel the feed rail 9 up or down relative to a horizontal plane which in FIG. 1 corresponds to the plane of the drawing. The important fact is that in the transfer area a closure part 3 bears on a check shoulder 13 and thus can be picked up by a transfer device 23. The transfer head 25 has to be swiveled from the vertical position shown in FIG. 2 if the feed rail 9 is inclined relative to a horizontal.

The feed unit 1 described here is characterized by the fact that the mechanical structure is very simple. The check shoulder 13 is stationary and fixed and can be part of the feed rail 9. This reliably ensures that a closure part 3 delivered via the feed device 7 or its feed rail 9 comes to a stop in the transfer area where a firmly defined transfer by the transfer head 25 is made possible without the need for elaborate controls or mechanics.

The lower boundary wall 31 of the feed rail 9 shown in FIG. 1 can be made lower than the upper boundary wall 17 so that the transfer head 25 only has to execute a very low downward movement in order to engage in the inside of the closure part 3.

The feed unit 1 is here part of a container closure device. It is also possible to additionally provide a container filler device and to combine this with the feed unit 1.

FIG. 2 shows clearly that the inclination of the closure part 3 is chosen such that one side wall 33 of the closure is sunk into the transport channel 11 so that the transfer head 25 guided in the direction of the arrow 29 does not strike against the outside of the closure part 3 and push it in an undefined manner out of the feed device 7. As a result of the inclination of the closure part 3 and the lowering of the side wall 33, it is thus possible to ensure that the transfer head 25 is driven reliably inside of the closure part 3. It is even possible to guide the closure part 3 out of the feed rail 9 with the aid of the transfer head 25 without the transfer head 25 having to be lowered during transfer.

It is moreover possible to provide the feed rail 9 with a guide channel 35 which engages around an edge area 37 of the closure part 3 and is in a U-shape and it guides the closure part. This makes it easy to ensure that the closure part 3 in the transfer area is inclined so that the transfer head 25 cannot strike against the outer edge of the closure part 3. It is also possible to design the bottom of the feed rail 9 such that one area, here the right-hand area 39, is higher than another area, here the left-hand area 41. The left-hand area 41 lies in the area of the opening 19. Because the bottom of the feed rail 9 is slightly lowered here, the closure part 3 can be guided safely through the opening 19. Moreover, the fact that the right-hand area 39 is higher makes it particularly easy to arrange the edge area 37 of the closure part 3 in a sunken position so that the transfer head 25 can pass particularly easily into the inside of the closure part 3.

FIG. 2 also shows that in the contact area of the feed rail 9, in particular in the area of the transport channel 11, a holding device can be provided which serves to secure the closure parts 3 in the area of the feed rail 9 so that even if vibrations occur they cannot spring out of the feed rail 9 or transport channel 11.

A particularly preferred holding device is one which is designed in such a way that the closure part 3 is held in the position in which it bears on the check shoulder 13, that is to say at the so-called pick-up point. The holding device can be formed in different ways. For example, in the case of ferromagnetic closure parts, it is conceivable to build up a magnetic holding force which is such that the closure parts are held securely at the pick-up point but their movement past this point is not impeded.

In the illustrative embodiment shown in FIG. 2, the holding device 43 has a bore 45 which cuts through the bottom of the transport channel 11 at an angle of 90° in the area in which a closure part 3 comes to lie when it bears on the check shoulder 13. The holding forces can be built up by air, for example by means of air being blown through the bore 45 toward the closure part 3, which air then flows through between the bottom of the transport channel 11 and the underside of the closure part 3 and thus creates an underpressure. However, it is also conceivable to allow a vacuum or underpressure to act via the bore 45 on the closure part 3 in order to hold the latter securely at the pick-up point.

The holding device 43 described here ensures that the closure part 3 is located in a defined position when the transfer head 25 passes into the inside of the closure part 3.

Although the present invention has been described in relation to a particular embodiment thereof, many other variations and modifications and other uses will become apparent to those skilled in the art. It is preferred, therefore, that the present invention be limited to not by the specific disclosure herein, but only by the appended claims.

What is claimed is:

1. A feed unit for container closures, the feed unit comprising:

a feed device including a support for closures, the support defining a feed path and including a flat bearing surface along which the closures move to a predetermined position to be engaged by a transfer device;

a work station at which containers are closed;

a transfer device operable into engagement with the closures in the feed device for transferring the closures from the feed device to the work station;

the feed device having a stationary check shoulder which protrudes into the feed path of the closures along the feed device to stop the movement of the closures at the predetermined position along the feed path for engagement by the transfer device, the bearing surface being rotated relative to the horizontal around a line defining the feed direction of the closures on the feed device.

2. The feed unit of claim 1, wherein the transfer device comprises a transfer head movable along a movement path so that the transfer head engages a closure located at the check shoulder of the feed devices and transfers the closures from the feed device.

3. The feed unit of claim 2, wherein the transfer head is movable up and down, toward and away from the closure located at the check shoulder and selectively engages and separates from the closure.

4. The feed unit of claim 3, wherein the movement path of the transfer head is a circular path and the closures are supported at the check shoulder of the feed device and in the circular path of the transfer head.

5. The feed unit of claim 1, wherein the feed device support for closures comprises a feed rail and the closures are supported on and transported along the feed rail of the feed device.

6. The feed unit of claim 5, wherein the feed rail includes the bearing surface for the closures, and the bearing surface is rotated relative to the horizontal in an area at which the closures are transferred by the transfer device from the feed device.

7. The feed unit of claim 6, wherein the angle of rotation of the bearing surface is in the range of 5° to 80° from the horizontal toward the transfer device.

8. The feed unit of claim 1, wherein immediately before the check shoulder along the feed path of the closures, the feed path of the feed device is inclined at an angle around the work station.

9. The feed unit of claim 8, wherein the angle around the work station is in the range of ±60°.

10. The feed unit of claim 8, wherein the angle around the work station is in the range of +60° to −20°.

11. The feed unit of claim 8, wherein the angle around the work station is in the range of +40° to −10°.

12. The feed unit of claim 1, wherein the closures are designed as preliminary closures which are fed by the feed device, the transfer device is shaped so that it places the preliminary closures on the mouth areas of containers which are to be closed and which are located at the workstation.

13. The feed unit of claim 1, wherein the angle of rotation of the bearing surface is in the range of 5° to 80° from the horizontal toward the transfer device.

14. The feed unit of claim 6, wherein the feed rail includes a guide channel which receives an outer edge of the closure.

15. The feed unit of claim 14, wherein the guide channel is located at the lower end of the feed rail relative to the horizontal.

16. The feed unit of claim 1, wherein the feed device includes a guide channel which receives an outer edge of the closure.

17. The feed unit of claim 16, wherein the guide channel is located at the lower end of the feed rail relative to the horizontal.

18. The feed unit of claim 5, wherein one portion of the bottom of the feed rail is elevated above another portion thereof.

19. The feed unit of claim 5, wherein the feed rail includes a holding device which secures the closure against unintended movement out of the feed rail.

20. The feed unit of claim 19, wherein the holding device provides a magnetic holding force for the closure.

21. The feed unit of claim 19, wherein the holding device provides a holding force by way of an air pressure differential.

22. The feed unit of claim 1, wherein the support for the closures includes a holding device which secures the closure against unintended movement out of the support.

23. The feed unit of claim 22, wherein the holding device provides a magnetic holding force for the closure.

24. The feed unit of claim 22, wherein the holding device provides a holding force by way of an air pressure differential.

* * * * *